US012140994B2

(12) United States Patent
Levine

(10) Patent No.: US 12,140,994 B2
(45) Date of Patent: Nov. 12, 2024

(54) ACCESSORY DISPLAY DEVICE

(71) Applicant: Xebec, Inc., Austin, TX (US)

(72) Inventor: Alex Cole Levine, Austin, TX (US)

( * ) Notice: Subject to any disclaimer, the term of this patent is extended or adjusted under 35 U.S.C. 154(b) by 0 days.

(21) Appl. No.: 18/407,143

(22) Filed: Jan. 8, 2024

(65) Prior Publication Data

US 2024/0143022 A1 May 2, 2024

Related U.S. Application Data

(63) Continuation of application No. 18/157,075, filed on Jan. 20, 2023, now Pat. No. 11,907,012, which is a continuation of application No. 17/074,632, filed on Oct. 20, 2020, now Pat. No. 11,573,596, which is a continuation-in-part of application No. 16/673,920, filed on Nov. 4, 2019, now Pat. No. 10,809,762.

(51) Int. Cl.
*G06F 1/16* (2006.01)
(52) U.S. Cl.
CPC .......... *G06F 1/1607* (2013.01); *G06F 1/1616* (2013.01); *G06F 1/1632* (2013.01)
(58) Field of Classification Search
CPC .................................................... G06F 1/1607
See application file for complete search history.

(56) References Cited

U.S. PATENT DOCUMENTS

| | | |
|---|---|---|
| 1,936,558 A | 11/1933 | Meyers |
| 5,035,392 A | 7/1991 | Gross et al. |
| 5,768,096 A | 6/1998 | Williams et al. |
| 6,151,401 A | 11/2000 | Annaratone |
| 6,222,507 B1 | 4/2001 | Gouko |
| D449,302 S | 10/2001 | Jung |
| 6,302,612 B1 | 10/2001 | Fowler et al. |
| 6,532,146 B1 * | 3/2003 | Duquette .............. G06F 1/1607 361/679.04 |

(Continued)

FOREIGN PATENT DOCUMENTS

| | | |
|---|---|---|
| CA | 189545 S | 4/1919 |
| CN | 304986389 | 1/2019 |

(Continued)

OTHER PUBLICATIONS

"DUEX", https://www.mobilepixels.us/products/duex as viewed Nov. 13, 2019, United States.

(Continued)

*Primary Examiner* — Lisa Lea-Edmonds
(74) *Attorney, Agent, or Firm* — Stovall Legal, PLLC; Blake D. Stovall

(57) ABSTRACT

An accessory display device comprises a first hinge configured to engage a first side of a primary display device and a second hinge configured to engage a second side of the primary display device. The accessory display device further comprises a first display coupled to the first hinge. The first display is rotatable about the first hinge between a first use position and a first stowed position. The accessory display device further comprises a second display coupled to the second hinge. The second display is rotatable about the second hinge between a second use position and a second stowed position. The accessory display device further comprises a tensioning mechanism configured to provide tension between the first hinge and the second hinge.

26 Claims, 9 Drawing Sheets

(56) References Cited

U.S. PATENT DOCUMENTS

| | | |
|---|---|---|
| 6,643,124 B1 | 11/2003 | Wilk |
| 6,667,877 B2 | 12/2003 | Duquette |
| 6,794,798 B2 | 9/2004 | Watanabe et al. |
| 6,859,219 B1 | 2/2005 | Sall |
| 6,967,632 B1 | 11/2005 | Minami et al. |
| D534,214 S | 12/2006 | Marcy et al. |
| 7,283,353 B1 | 10/2007 | Jordan et al. |
| 7,375,954 B2 * | 5/2008 | Yang .................. G06F 1/1622 248/920 |
| D594,236 S | 6/2009 | Sidiropoulos |
| D599,357 S | 9/2009 | Kaufman |
| 7,633,744 B2 | 12/2009 | Kuhn |
| D615,082 S | 5/2010 | Taichi |
| 7,752,789 B2 | 7/2010 | Sun et al. |
| 7,813,118 B2 | 10/2010 | Burge |
| D630,204 S | 1/2011 | Kovac |
| D630,205 S | 1/2011 | Kovac |
| D630,206 S | 1/2011 | Kovac |
| D630,628 S | 1/2011 | Kovac |
| D634,745 S | 3/2011 | Park et al. |
| 7,936,558 B2 * | 5/2011 | Chang .................. G06F 1/1616 361/679.04 |
| 8,018,715 B2 * | 9/2011 | Chang .................. G06F 1/1647 361/679.04 |
| D652,832 S | 1/2012 | Wu et al. |
| 8,243,471 B2 | 8/2012 | Liang |
| 8,317,146 B2 | 11/2012 | Jung et al. |
| D679,707 S | 4/2013 | Aarrestad et al. |
| D694,754 S | 12/2013 | Nakada |
| 8,842,425 B2 | 9/2014 | Ryu |
| 8,854,278 B2 | 10/2014 | Parker et al. |
| D761,800 S | 7/2016 | Muller |
| 9,393,757 B2 | 7/2016 | Borchardt et al. |
| 9,395,757 B2 | 7/2016 | Relf |
| 9,441,782 B2 | 9/2016 | Funk et al. |
| D770,447 S | 11/2016 | Endo et al. |
| D770,448 S | 11/2016 | Endo et al. |
| 9,523,461 B2 | 12/2016 | Kuan et al. |
| 9,568,952 B2 | 2/2017 | Matzke et al. |
| 9,696,760 B1 | 7/2017 | Zhang |
| D810,079 S | 2/2018 | Boesiger et al. |
| 9,927,839 B2 | 3/2018 | Kummer et al. |
| 10,082,832 B1 | 9/2018 | Wang et al. |
| 10,168,739 B1 | 1/2019 | Chen |
| D864,958 S | 10/2019 | Yüksek et al. |
| 10,809,762 B1 * | 10/2020 | Levine .................. G06F 1/1647 |
| 10,817,020 B1 * | 10/2020 | DeMaio .................. G06F 3/1423 |
| 10,871,801 B2 * | 12/2020 | Yao .................. G06F 1/1649 |
| D910,624 S | 2/2021 | Hudgins et al. |
| 10,944,937 B2 | 3/2021 | Pei |
| D920,975 S | 6/2021 | Yao et al. |
| 11,169,571 B2 * | 11/2021 | DeMaio .................. G06F 1/1679 |
| D938,436 S | 12/2021 | Gu |
| 11,209,869 B2 | 12/2021 | Hudgins et al. |
| D956,752 S | 7/2022 | Wang |
| D960,887 S | 8/2022 | Levine |
| D962,222 S | 8/2022 | Leung et al. |
| 11,416,024 B2 * | 8/2022 | Bryant .................. G06F 1/1632 |
| 11,573,596 B2 * | 2/2023 | Levine .................. G06F 1/1647 |
| 11,907,012 B2 * | 2/2024 | Levine .................. G06F 1/1616 |
| 12,093,076 B2 * | 9/2024 | Levine .................. G06F 1/1632 |
| 2003/0095373 A1 * | 5/2003 | Duquette .............. G06F 1/1683 361/679.04 |
| 2005/0006331 A1 | 1/2005 | Engel |
| 2005/0237699 A1 | 10/2005 | Carroll |
| 2005/0253775 A1 | 11/2005 | Stewart |
| 2006/0059751 A1 | 3/2006 | Chen et al. |
| 2006/0082518 A1 | 4/2006 | Ram |
| 2007/0247798 A1 | 10/2007 | Scott |
| 2008/0198096 A1 | 8/2008 | Jung |
| 2009/0102744 A1 | 4/2009 | Ram |
| 2009/0201222 A1 | 8/2009 | Damian |
| 2010/0039350 A1 | 2/2010 | Wakefield et al. |
| 2010/0053027 A1 | 3/2010 | Tonnison et al. |
| 2010/0124006 A1 * | 5/2010 | Chang .................. G06F 1/1624 361/679.04 |
| 2011/0019360 A1 | 1/2011 | Thabit |
| 2011/0155868 A1 | 6/2011 | Sun et al. |
| 2012/0223872 A1 | 9/2012 | Ram |
| 2012/0280603 A1 | 11/2012 | Hsu et al. |
| 2013/0077213 A1 | 3/2013 | Kao et al. |
| 2015/0212546 A1 * | 7/2015 | Ram .................. G06F 1/162 361/679.01 |
| 2015/0378393 A1 | 12/2015 | Erad et al. |
| 2016/0154434 A1 | 6/2016 | Lakhani |
| 2017/0003712 A1 | 1/2017 | Funk et al. |
| 2019/0018453 A1 * | 1/2019 | Rhodes .................. G06F 1/1647 |
| 2020/0278722 A1 * | 9/2020 | Hudgins .............. H05K 5/0247 |
| 2020/0333843 A1 * | 10/2020 | Yao .................. G06F 1/1622 |
| 2021/0080999 A1 * | 3/2021 | Bryant .................. G06F 1/1641 |
| 2021/0096599 A1 * | 4/2021 | DeMaio .................. G06F 1/1624 |
| 2021/0134130 A1 | 5/2021 | Kiani et al. |
| 2021/0405702 A1 | 12/2021 | Hudgins et al. |
| 2022/0057836 A1 * | 2/2022 | DeMaio .................. G06F 3/1423 |
| 2022/0075421 A1 * | 3/2022 | Hudgins .................. G06F 1/1616 |
| 2022/0107669 A1 * | 4/2022 | Emam .................. G06F 1/1656 |
| 2022/0390982 A1 * | 12/2022 | Levine .................. G06F 1/1632 |
| 2023/0152846 A1 * | 5/2023 | Levine .................. G06F 1/1647 361/679.04 |
| 2023/0152847 A1 * | 5/2023 | Levine .................. G06F 1/1637 361/679.04 |
| 2024/0143022 A1 * | 5/2024 | Levine .................. G06F 1/1647 |
| 2024/0310871 A1 * | 9/2024 | Levine .................. G06F 1/1637 |

FOREIGN PATENT DOCUMENTS

| | | |
|---|---|---|
| CN | 305087700 S | 3/2019 |
| JP | D1720415 | 7/2022 |
| KR | 3011339040000 | 10/2021 |

OTHER PUBLICATIONS

"Sidetrak", https://sidetrak.com as viewed Nov. 14, 2019, United States.

"Slidenjoy—Le Slide", https://yourslide.com as viewed Nov. 13, 2019, United States.

* cited by examiner

ACCESSORY DISPLAY DEVICE

CROSS-REFERENCE TO RELATED APPLICATIONS

This application claims the priority benefit of U.S. patent application Ser. No. 18/157,075, filed Jan. 20, 2023, which claims the priority benefit of U.S. patent application Ser. No. 17/074,632, filed Oct. 20, 2020, which claims the priority benefit of U.S. patent application Ser. No. 16/673,920, filed Nov. 4, 2019.

BACKGROUND OF THE INVENTION

Laptop computers have been a huge benefit for people who like to have the ability of a personal computer wherever they are. Whether it be for work, study, or entertainment, the portability of laptop computers has been very advantageous. However, the tradeoff for laptop computers portability has always been the size of the display screen. The bigger the display, the bigger the laptop computer and the less portable it becomes. Therefore, there is a need for a device which allows for the laptop computer display to be expanded. There is also a need for a device that allows for the laptop computer display to be expanded and may be added onto the laptop computer easily and is also compact and portable.

SUMMARY OF THE INVENTION

An example embodiment relates to an accessory display device for a computer. The device includes a first hinge configured to engage a first side of a primary display device. The device also includes a first display coupled to the first hinge, wherein the first display is rotatable about the first hinge between a first use position and a first stowed position. The device also includes a second hinge configured to engage a second side of the primary display device. The device also includes a second display coupled to the second hinge, wherein the second display is rotatable about the second hinge between a second use position and a second stowed position. The device also includes a tensioning mechanism configured to provide tension between the first hinge and the second hinge.

Another example embodiment relates to an accessory display device for a computer. The device includes a first accessory display support portion, a second accessory display support portion, and a tensioning mechanism. The first accessory display support portion comprises a first display, a first hinge, and a first lip portion. The first display is coupled to the first hinge and the first lip portion is configured to engage a first side of a primary display device. The second accessory display support portion comprises a second display, a second hinge, and a second lip portion. The second display is coupled to the second hinge and the second lip portion is configured to engage a second side of the primary display device. The tensioning mechanism is configured to produce tension between the first accessory display support portion and the second accessory display support portion.

Another example embodiment relates to an accessory display device for a computer. The device includes a first rail and a second rail configured to be slidable relative to one another. The device also includes a first hinge coupled to the first rail, a first accessory display coupled to the first hinge, and a first lip configured to engage with a first side of a primary display device. The device also includes a second hinge coupled to the second rail, a second accessory display coupled to the second hinge, and a second lip configured to engage with a second side of the primary display device. The device also includes a tensioning mechanism configured to maintain engagement between the first lip and the first side of the primary display device and between the second lip and the second side of the primary display device.

Another example embodiment relates to an accessory display device for a computer. The device includes a first accessory display support portion comprising a first hinge, a first lip portion, a first support rail, and a first tensioning point. The first lip portion is configured to engage a first side of a primary display device. The device further includes a first accessory display coupled to the first hinge. The first accessory display is rotatable about the first hinge between a first use position and a first stowed position.

In addition to the foregoing, other aspects are described in the claims, drawings, and text forming a part of the disclosure set forth herein. The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the disclosures set forth herein.

BRIEF DESCRIPTION OF DRAWINGS

The use of the same symbols in different drawings typically indicates similar or identical items unless context dictates otherwise.

DETAILED DESCRIPTION OF THE INVENTION

Figure 1:
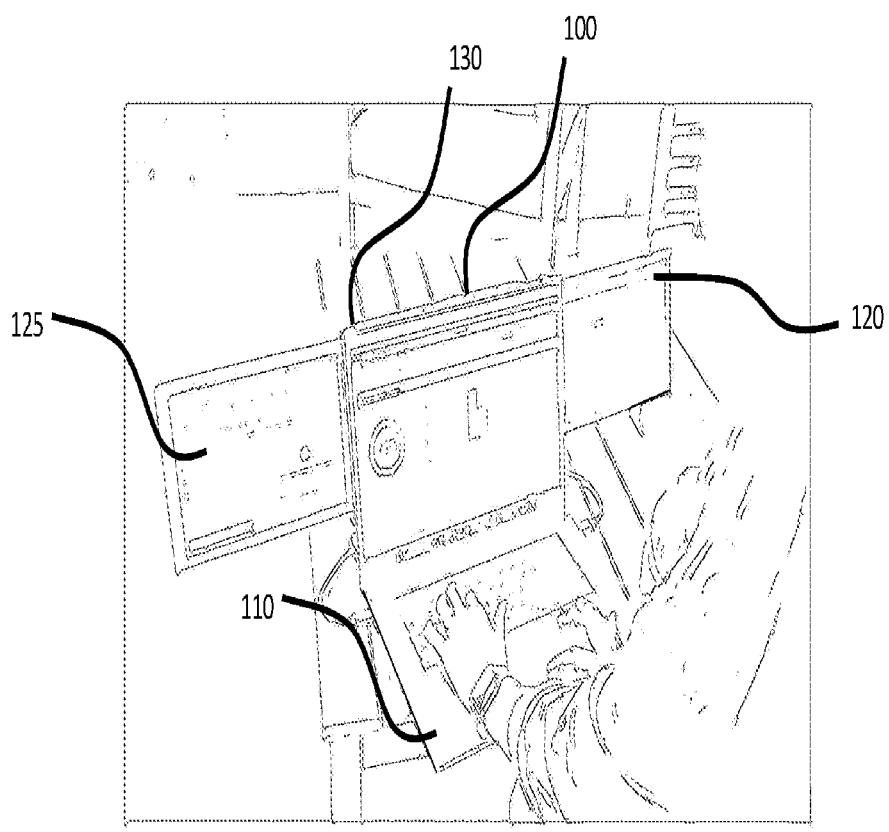
FIG. 1 is a depiction of an accessory display device for a laptop computer in accordance with an example embodiment.

Referring to FIG. 1, a computer display accessory 100 is depicted coupled to a laptop computer 110. Computer display accessory 100 is not limited to laptop computers but may be used on any type of display device including but not limited to tablets, e-readers, gaming devices, desktop displays, television displays, etc. Therefore, computer display accessory 100 is not limited to computers and in fact may be utilized on any type of display. Display accessory 100 adds two additional screens 120 and 125 to any existing display. Display accessory 100 expands the screen display real estate with two slidable screens that pull out from the back edges of a housing 130. Housing 130 itself is universal, fitting laptops of all sizes and uses tension from elastic to tighten around the edges of the laptop screen.

Figure 2:
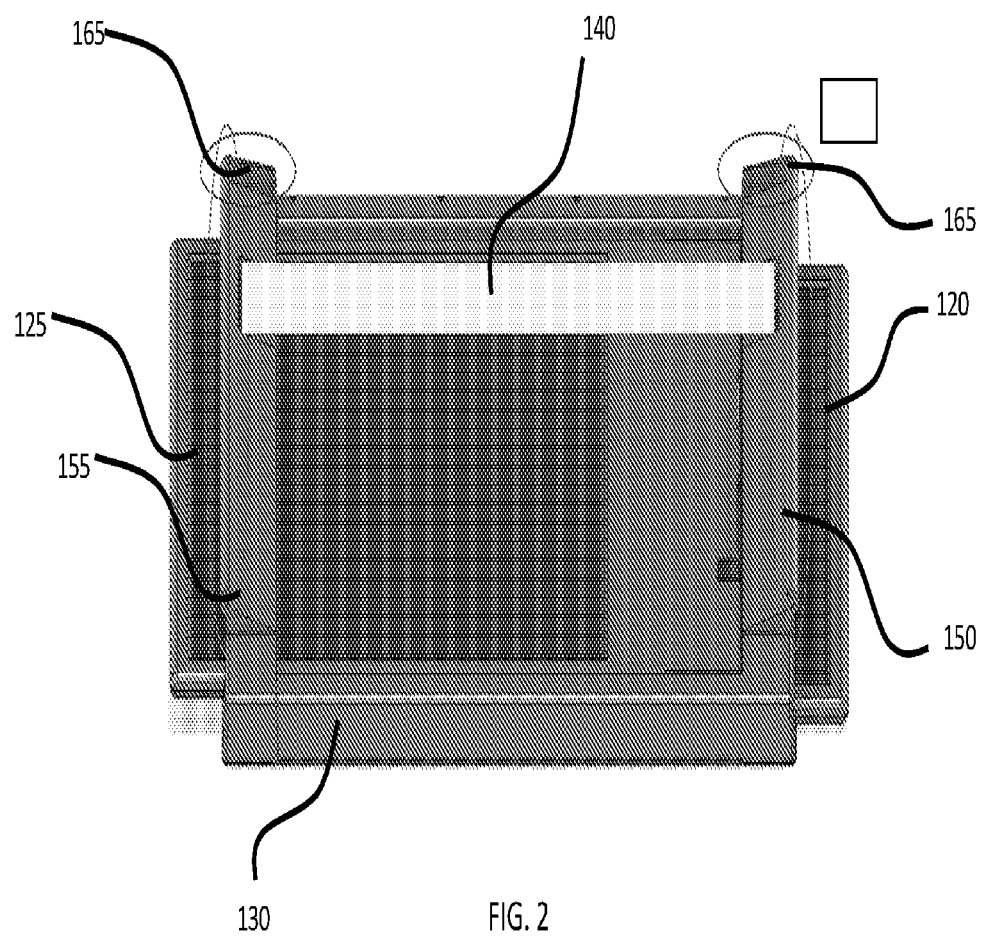
FIG. 2 is an example embodiment of the accessory display device of FIG. 1 removed from the laptop computer.

Referring to FIG. 2, housing 130 includes a mechanism that allows the screens to engage with the lid of the computer display accessory 110 and to pull out from either side. Housing 130 uses an elastic band 140 or other tensioning member to create tension between a right frame clip 150 and a left frame clip 155 which creates force when pulled apart to put on the lid, effectively clamping either side to the computer lid. There is also a lip 160 on the top of right frame clip 155 and a lip 165 on the top of left frame clip 155. The lip helps to further secure display accessory 100 on the top of computer 110 display and helps further secure computer display accessory 100 to computer 110. When a user pulls apart the left and right sides of housing 130, an increasing tension is created in the elastic band forcing either side back towards each other. This is what creates the "clamping" effect of the right frame clip 150 and the left frame clip 155.

In accordance with an example embodiment, elastic band 140 may be replaced with any type of suitable tensioning member, including but not limited to a spring, a rubber band, resilient plastic portions, etc. These tensioning members may be coupled to housing portions 170 and 175 in any of a variety of ways including but not limited to with glue, by melting, by tying or sewing, by clipping, etc. In one example, the band 140 may be threaded through a cutout on each portion of housing 130. Once threaded through the cutout, a blocking piece which does not fit through the cutout is affixed to the band so the band does not slip back through the cutout and maintains tension on the band. Any of a variety of ways may be used to attach the tensioning member to the two housing portions without departing from the scope of the invention.

Figure 3:
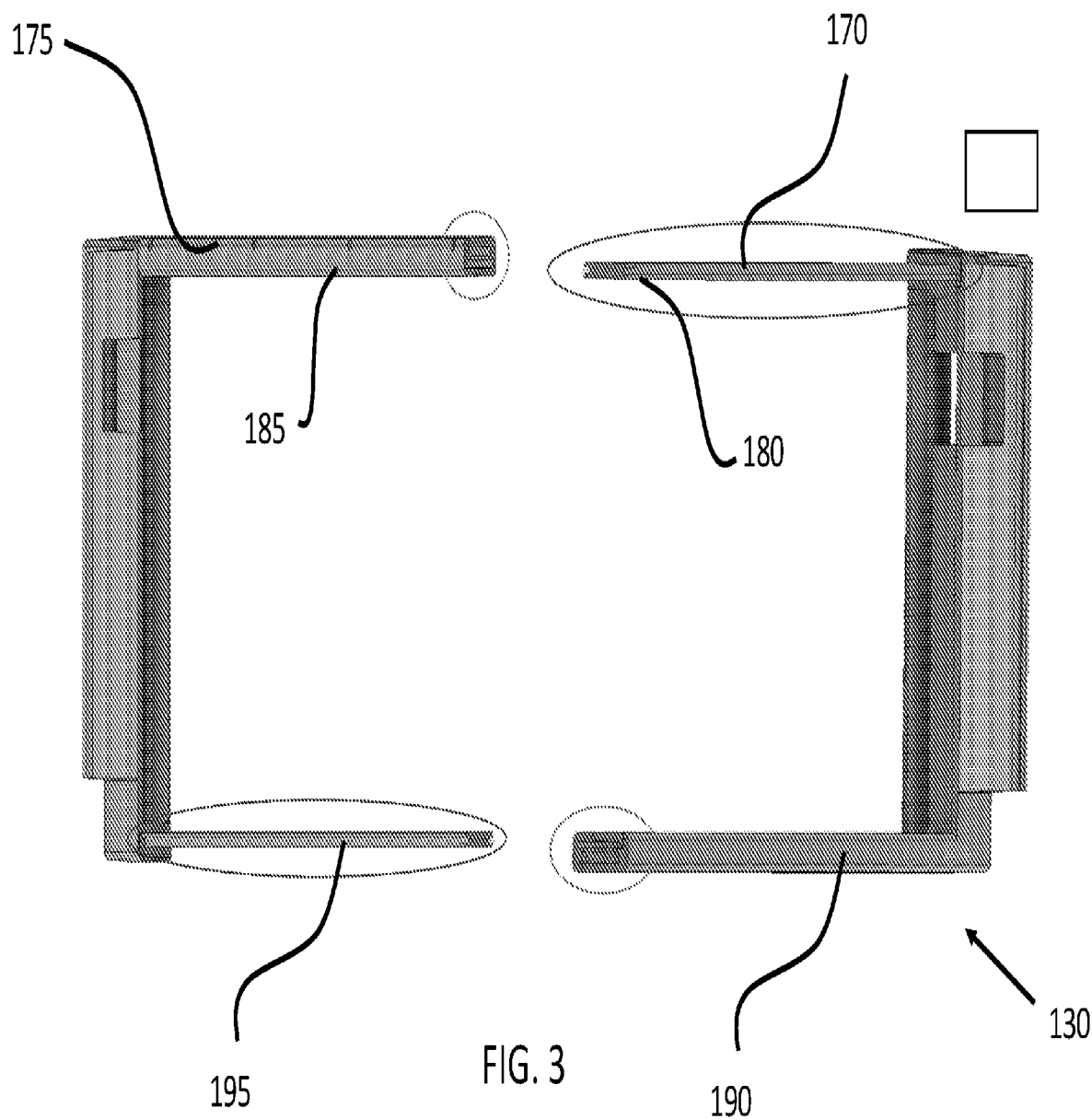
FIG. 3 is an example embodiment of the housing accessory display device of FIG. 1 in an exploded view.

Referring now to FIG. 3, the main part of housing 130 is shown as an exploded view of the two primary portions, right portion 170 and left portion 175. Right portion 170 includes an upper rail 180 and a lower rail 190. Likewise, left portion 175 includes an upper rail 185 and a lower rail 195. Upper rail 185 comprises a hollow female rail while upper rail 180 acts as a male rail complementary to rail 185 and slidable within rail 185. Lower rail 190 comprises a hollow female rail while lower rail 195 acts as a male rail complementary to rail 190 and slidable within rail 190. This design allows for housing 130 to be expandable to clamp onto virtually any size and type of display housing.

Once housing 130 is affixed to a computer or other display, a user may pull either or both of two display screens 120 and 125 from a stowed position to a use position as depicted in FIG. 1.

Figures 4, 5:
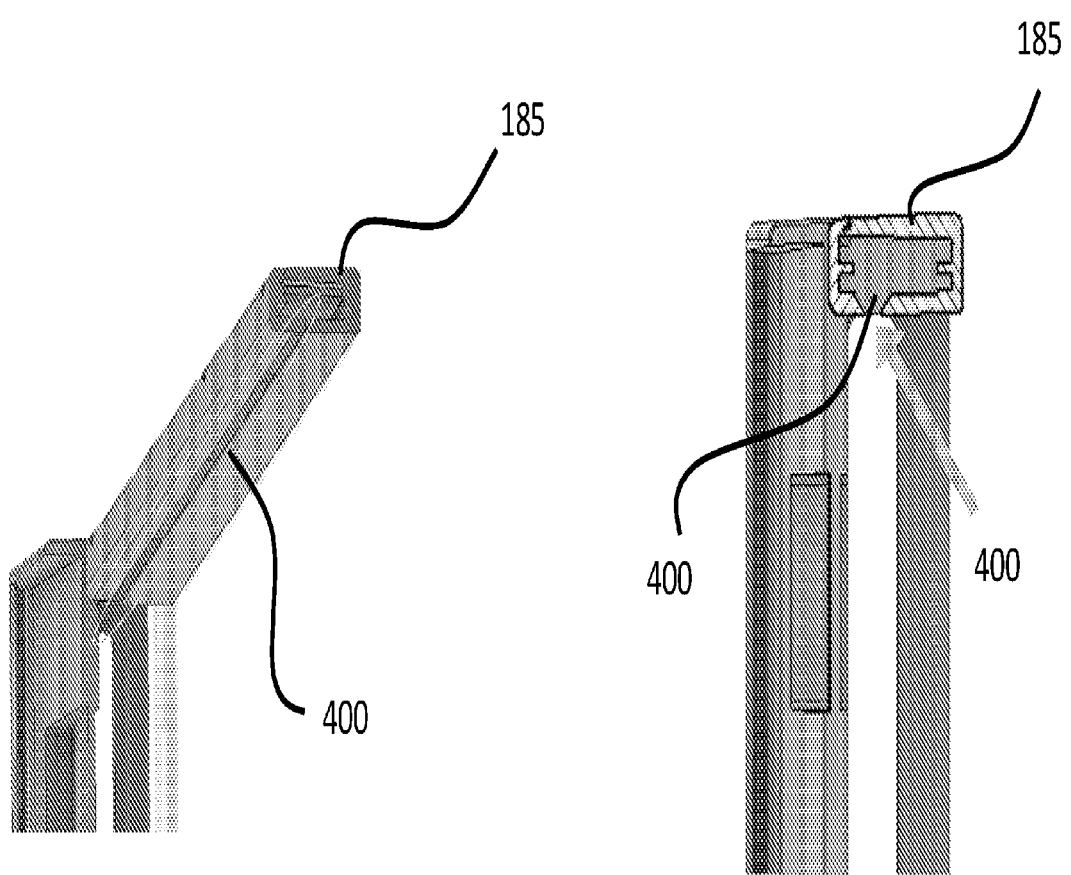
FIG. 4 is an example embodiment of a female rail of the housing.
FIG. 5 is an example cross-sectional view of the female rail of FIG. 4.
Figures 6, 7:
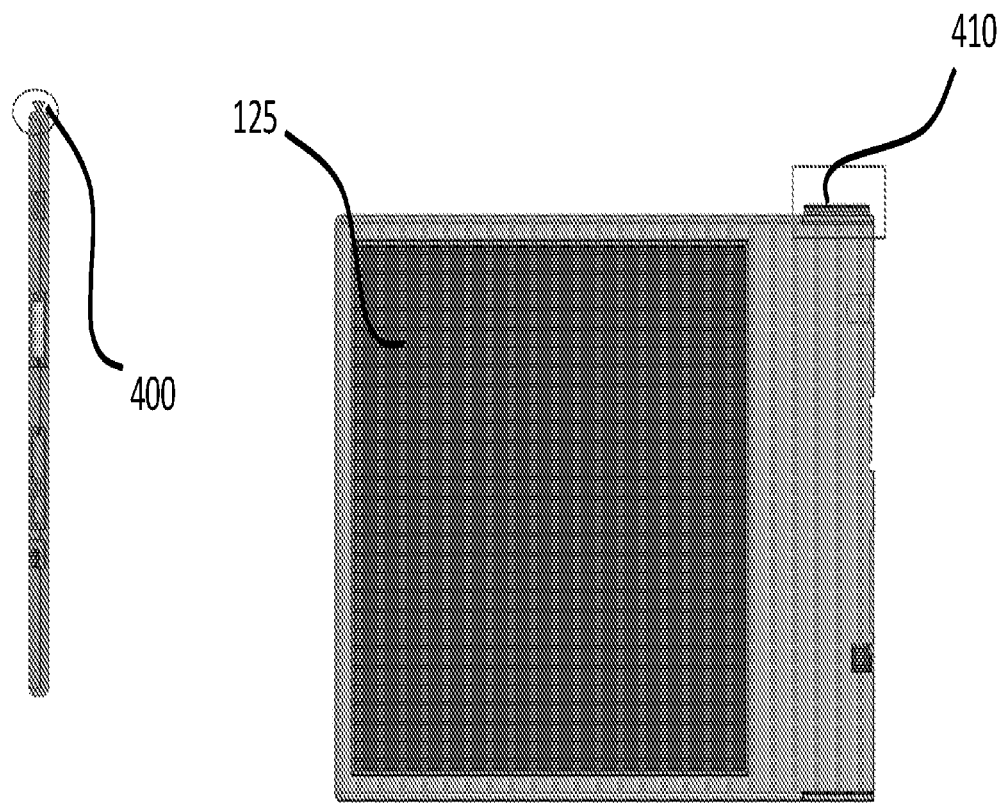
FIG. 6 is an example embodiment of a side view of a display showing a rail guide.
FIG. 7 is an example embodiment of a front view of the display of FIG. 6 showing a rail guide.

Referring now to FIG. 4, a triangular notch on the female sides of upper rail 185 and also lower rail 190 which are both the female rails, act to engage a triangular guiding slide 410 as depicted in FIG. 6 and FIG. 7 for display 125. Likewise, a triangular guiding slide is on the bottom edge of display 120. The cross-sectional view depicted in FIG. 6 shows how the triangular guiding slide 410 interfaces with the triangular notch 400.

Triangular guiding slide 400 also serves as a stopper to prevent the screen from falling out of rail 185 as display 125 is extended. Triangular guiding slide 400 also acts as a stopper on the other end of female rail 185 so that display 125 doesn't fall out the rail internally when display 125 is stowed.

Figure 8:
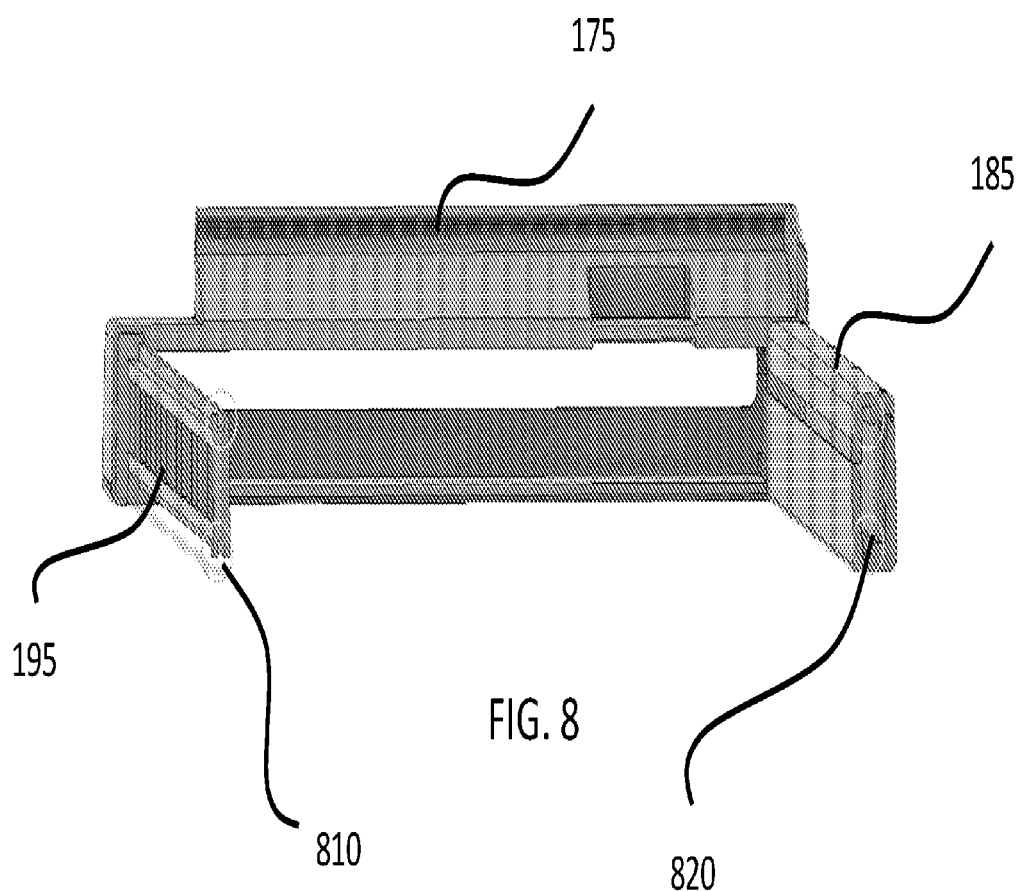
FIG. 8 is an example embodiment of a perspective end view of the left side housing portion.

Referring now to FIG. 8, an end view of the rails 185 and 195 of the left portion 175 of the housing 130 is depicted. Male rail 195 includes two guides that run along the length of rail 810. Guides 810 engage with female rail 190 which has a female cross-section similar to the female cross-section of rail 185. Rail 185 is depicted with a pair of opposing notches 820 that run along rail 185 and are configured to engage guides on male rail 180 like guides 810 of rail 195. The use of a combination of guides and complementary notches on rails 185 and 180 and similarly rails 195 and 190 allows for accurate sliding engagement of the two portions 170 and 175 of housing 130. The rail-to-rail engagement depicted is one example of an arrangement to enable expandability of housing 130 however any of a variety of other ways may be used without departing from the scope of the invention.

Figure 9:
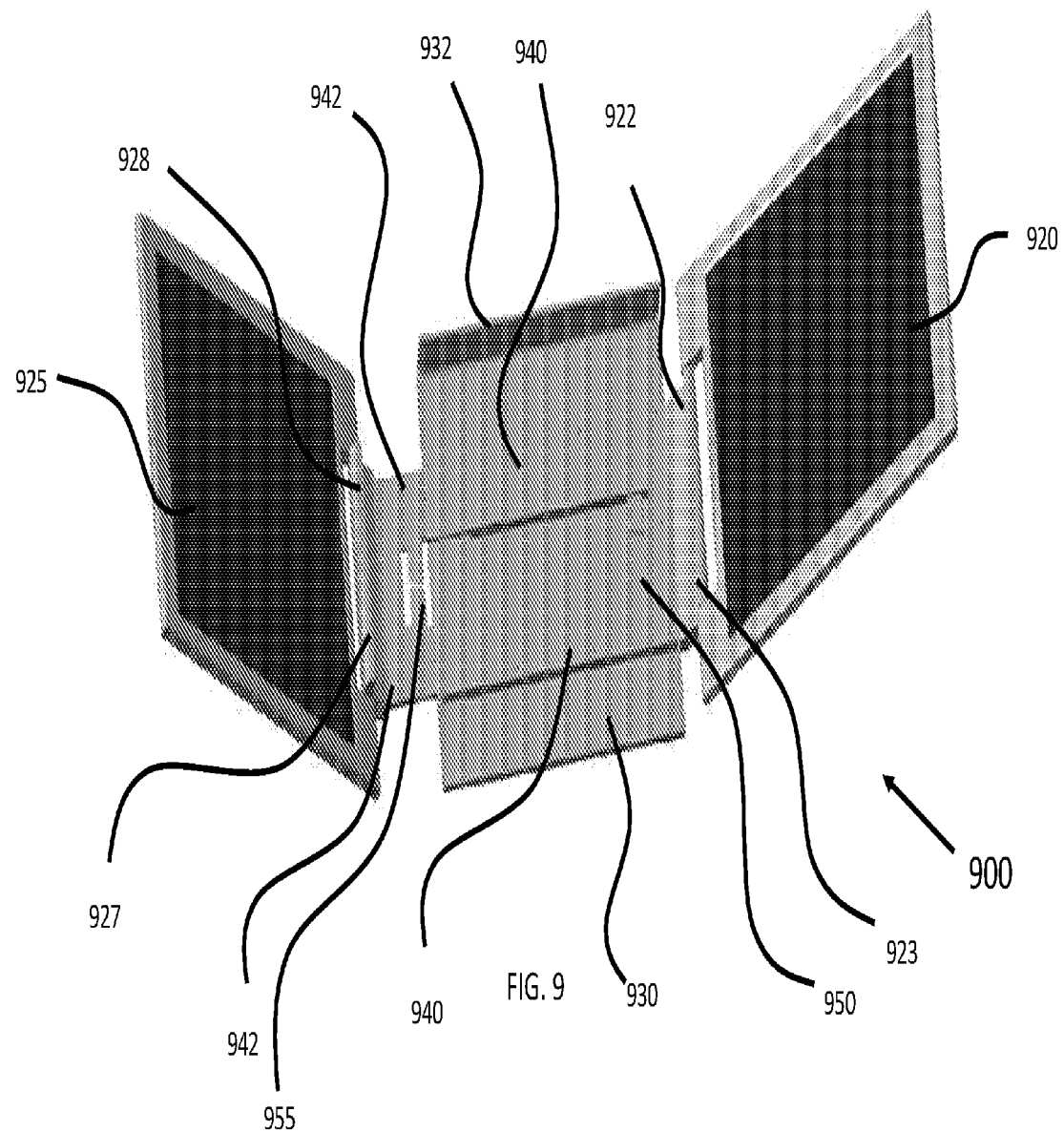
FIG. 9 is a depiction of an accessory display device for a laptop computer in accordance with another example embodiment depicted in a partially expanded position.

Referring now to FIG. 9, a computer display accessory 900 is depicted for coupling to a laptop computer or other computer display or object. Computer display accessory 900 is not limited to laptop computers but may be used on any type of display device including but not limited to tablets, e-readers, gaming devices, desktop displays, television displays, etc. Therefore, computer display accessory 900 is not limited to computers and in fact may be utilized on any type of display. Display accessory 900 adds two additional screens 920 and 925 to any existing display. Display accessory 900 expands the screen display real estate with two slidable screens that pull away from each other. A back support 930 is configured to fit laptops of a variety of sizes and uses tension from an elastic or other tensioning mechanism to tighten around the edges of the laptop screen. Back support 930 is coupled to and supports display 920. Display 920 is coupled to a hinge 922 which may be part of or coupled to back support 930. Back support 930 also supports a set of female rails 940. In accordance with an illustrative embodiment, a second display 925 is coupled to a pair of male support rails 942 by a hinge 927. Male support rails 942 are configured to slide in and out of female support rails 940. The sliding of male support rails 942 in and out of female support rails 940 allows the expansion of the distance between displays 920 and 925 in order to accommodate a larger primary display of the laptop computer or the like. Back support 930 includes a top lip portion 932. Top lip portion 932 is configured to allow display accessory 900 to hang on the top edge of a display screen of a laptop computer or the like. Hinge 927 also includes a lip portion 928, and hinge 922 includes a lip portion 923. Lip portions 928 and 923 are configured to grasp onto the side of a display of a laptop computer or the like. A tensioning elastic strap provides tension to pull lips 928 and 923 together to grasp and hold it in place on a display screen of a laptop computer or like in such a configuration as shown in FIG. 1 where display accessory 900 can replace display accessory 100 for a similar configuration.

Figure 10:
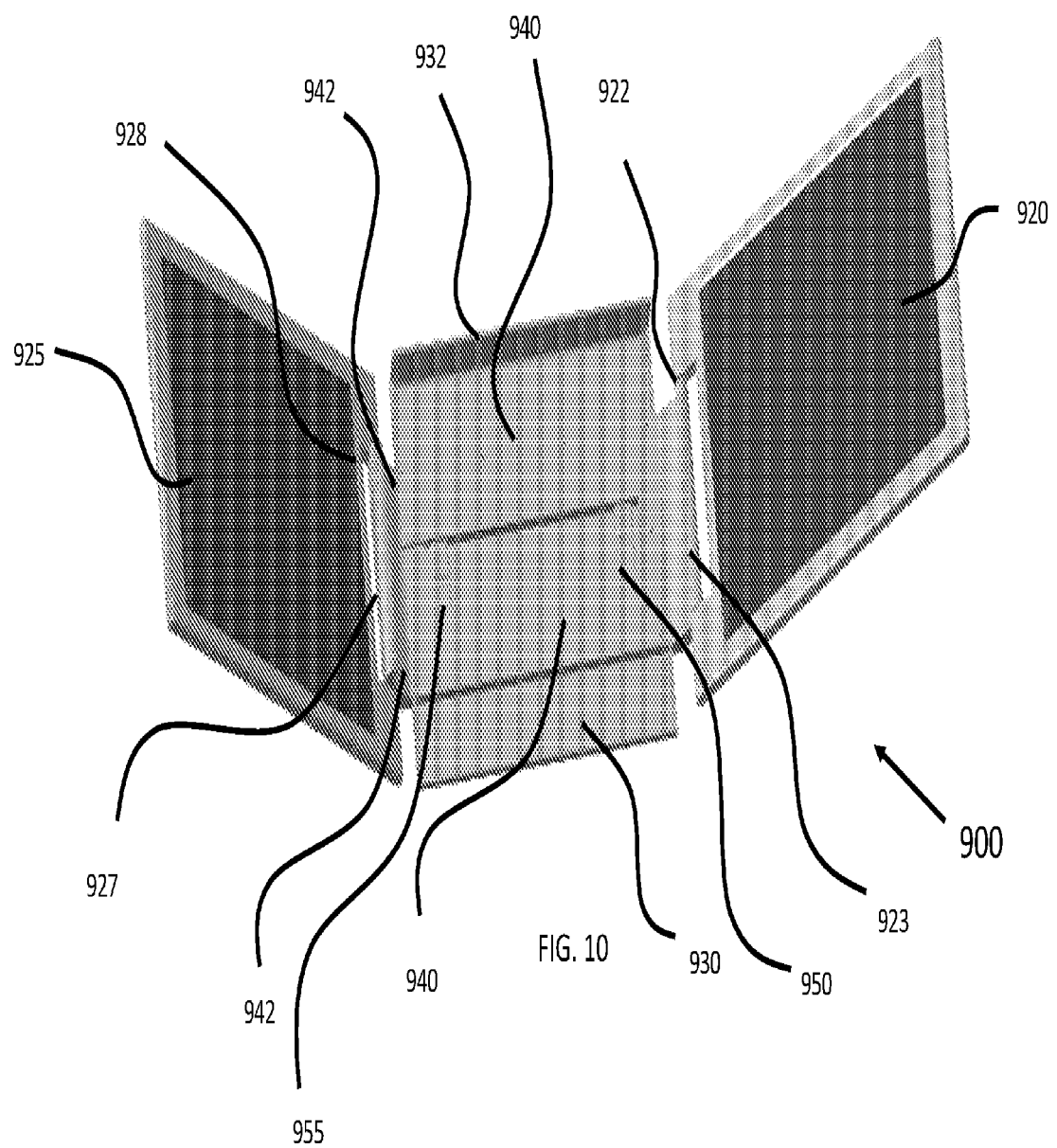
FIG. 10 is a depiction of the accessory display device of FIG. 9 in a for a laptop computer in accordance with another example embodiment depicted in a contracted position.

Referring now to FIG. 10, it may be seen how accessory 900 may be contracted as compared to FIG. 9. Male support rails 942 slide into female support rails 940. In various embodiments a tensioning device such as an elastic band (similar to the band 140 in FIG. 2) would extend from tensioning points 950 and 955, bringing displays 920 and 925 toward each other and allowing lips 923 and 928 to grasp a display screen of a notebook computer or the like.

Again, this illustrative configuration allows the use of varied sizes of main display screens that accessory 900 may be attached to for use therewith.

Figure 11:
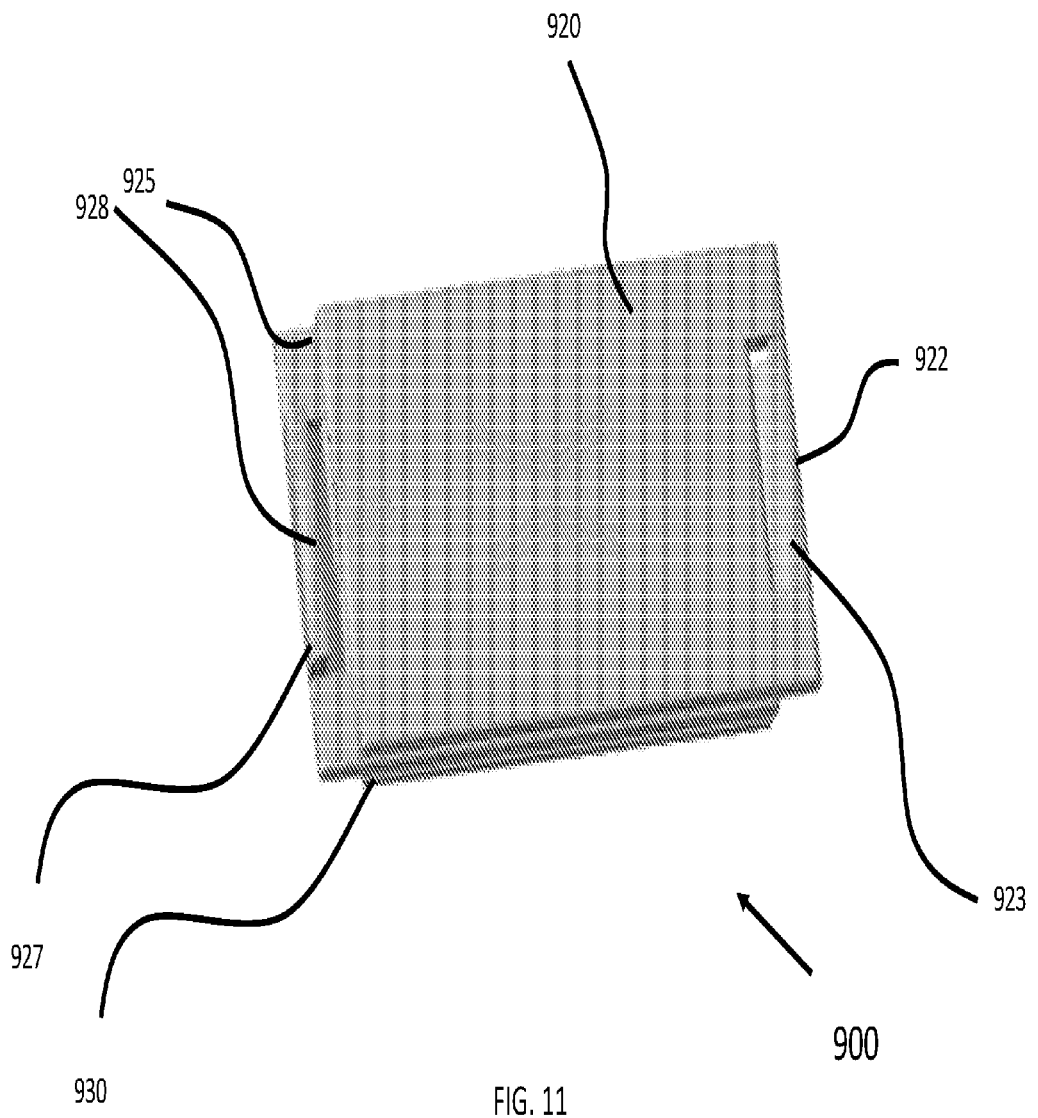
FIG. 11 is a depiction of the accessory display device of FIG. 9 in a for a laptop computer in accordance with another example embodiment depicted in a folded storage position.

Referring now to FIG. 11, accessory 900 is depicted in a folded stowage configuration. Accessory 900 includes the back support 930 overlaid with display 925 which is folded by hinge 927 to be flush with the back support 930. Display 920 is then folded over by hinge 922 to be flush with display 925. This folded configuration provides for more compact configuration of the accessory 900 for stowing. In accordance with various embodiments, display 920 may also be swung about hinge 922 180 degrees from the position depicted in FIG. 11 to be flush with the rear of a display screen of a laptop computer or the like that accessory 900 is mounted to. Alternatively, hinge 927 may be configured to allow display 925 to swing behind a laptop display or the like. If either of displays 920 or 925 are configured to swing around the backside of the laptop display, they may act as rear facing displays for any of a variety of purposes.

It should be noted that the device described may be formed of a number of different materials and formed in a variety of shapes without departing from the scope of the invention. Also, it should be noted that embodiments of the accessory device are designed to couple to the display device, such as but not limited to a laptop computer display, in a manner that is secure enough to carry the laptop computer with the accessory device attached thereto. In this way the portability of a device, such as a laptop computer is not compromised.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. An accessory display device comprising:
a first hinge configured to engage a first side of a primary display device;
a first display coupled to the first hinge, wherein the first display is rotatable about the first hinge between a first use position and a first stowed position;
a second hinge configured to engage a second side of the primary display device;
a second display coupled to the second hinge, wherein the second display is rotatable about the second hinge between a second use position and a second stowed position; and
a tensioning mechanism configured to provide tension between the first hinge and the second hinge.

2. The accessory display device of claim 1,
wherein the first hinge comprises a first lip portion and the second hinge comprises a second lip portion,
wherein the first hinge being configured to engage the first side of the primary display device comprises the first lip portion being configured to engage the first side of the primary display device, and
wherein the second hinge being configured to engage the second side of the primary display device comprises the second lip portion being configured to engage the second side of the primary display device.

3. The accessory display device of claim 2 further comprising a third lip portion configured to engage a third side of the primary display device.

4. The accessory display device of claim 3, wherein the third side of the primary display device is perpendicular to the first side of the primary display device and the second side of the primary display device.

5. The accessory display device of claim 1 further comprising:
a first support rail coupled with the first hinge, wherein the first support rail includes a first tensioning point; and
a second support rail coupled with the second hinge, wherein the second support rail includes a second tensioning point, wherein the tensioning mechanism extends between the first tensioning point and the second tensioning point.

6. The accessory display device of claim 5, wherein the tensioning mechanism includes one of an elastic strap, a spring, a rubber band, or a resilient plastic portion.

7. The accessory display device of claim 5, wherein the first support rail is a female support rail and the second support rail is a male support rail, wherein the first support rail is slidably engaged with the second support rail.

8. The accessory display device of claim 1, wherein the first display being in the first stowed position and the second display being in the second stowed position comprises the first display being flush with the second display.

9. An accessory display device comprising:
a first rail and a second rail configured to be slidable relative to one another;
a first hinge coupled to the first rail;
a first accessory display coupled to the first hinge;
a first lip configured to engage with a first side of a primary display device;
a second hinge coupled to the second rail;
a second accessory display coupled to the second hinge;
a second lip configured to engage with a second side of the primary display device; and
a tensioning mechanism configured to maintain engagement between the first lip and the first side of the primary display device and between the second lip and the second side of the primary display device.

10. The accessory display device of claim 9, wherein the tensioning mechanism is configured to transmit force to the first lip and the second lip via the first rail and the second rail.

11. The accessory display device of claim 10, wherein the first rail is a male rail and the second rail is a female rail, wherein the first rail and the second rail being configured to be slidable relative to one another comprises the first rail being slidably engaged with the second rail.

12. The accessory display device of claim 10, wherein the tensioning mechanism includes at least one of an elastic strap, a spring, a rubber band, or a resilient plastic portion.

13. The accessory display device of claim 9, further comprising a third lip configured to engage a third side of the primary display device.

14. The accessory display device of claim 13, further comprising a fourth lip configured to engage the third side of the primary display device.

15. The accessory display device of claim 13, wherein the first side of the primary display device is parallel to the second side of the primary display device and the third side of the primary display device is perpendicular to the first side of the primary display device and the second side of the primary display device.

16. An accessory display device comprising:
a first accessory display support portion comprising a first hinge, a first lip portion, a first support rail, and a first tensioning point, wherein the first lip portion is configured to engage a first side of a primary display device; and
a first accessory display coupled to the first hinge, wherein the first accessory display is rotatable about the first hinge between a first use position and a first stowed position.

17. The accessory display device of claim 16, further comprising:
a second accessory display support portion comprising a second hinge, a second lip portion, a second support rail, and a second tensioning point, wherein the second lip portion is configured to engage a second side of the primary display device; and
a second accessory display coupled to the second hinge, wherein the second accessory display is rotatable about the second hinge between a second use position and a second stowed position.

18. The accessory display device of claim 17, further comprising a third lip portion configured to engage a third side of the primary display device, wherein the third side of the primary display device is substantially perpendicular to the first side of the display device and the second side of the display device.

19. The accessory display device of claim 18, further comprising a tensioning mechanism, wherein the tensioning mechanism comprises the first tensioning point, the second tensioning point, and a tensioning device extending between the first tensioning point and the second tensioning point.

20. The accessory display device of claim 19, wherein the first lip portion being configured to engage the first side of the primary display device and the second lip portion being configured to engage the second side of the primary display device comprises the first lip portion and the second lip portion being configured to engage the respective sides of the primary display device via tension produced by the tensioning mechanism and transmitted via the first tensioning point and the second tensioning point.

21. The accessory display device of claim 19, wherein the tensioning mechanism comprises an elastic strap, a spring, a rubber band, or a resilient plastic portion.

22. The accessory display device of claim 17, wherein the first support rail and the second support rail are slidable relative to each other.

23. The accessory display device of claim 16, further comprising:
a second accessory display support portion comprising a second support rail and a second tensioning point, wherein the first support rail is slidably engaged with the second support rail; and
a tensioning mechanism comprising the first tensioning point, the second tensioning point, and a tensioning device extending between the first tensioning point and the second tensioning point.

24. The accessory display device of claim 23, wherein the first support rail comprises at least one notch and the second support rail comprises at least one guide and wherein the at least one guide is configured to engage the at least one notch.

25. The accessory display device of claim 16, further comprising a tensioning mechanism, wherein the tensioning mechanism comprises the first tensioning point, a second tensioning point, and a tensioning device extending between the first tensioning point and the second tensioning point.

26. The accessory display device of claim 25, wherein the first lip portion is configured to engage the first side of the primary display device based, at least in part, on tension generated by the tensioning mechanism.

\* \* \* \* \*